May 17, 1960  H. PÜTZ  2,936,784
GAS TAP MECHANISM
Filed June 2, 1955

INVENTOR.
BY

United States Patent Office 2,936,784
Patented May 17, 1960

2,936,784
GAS TAP MECHANISM

Hans Pütz, Remscheid, Germany, assignor to Joh. Vaillant K.G., Remscheid, Germany Application June 2, 1955, Serial No. 512,633

Claims priority, application Germany June 2, 1954

2 Claims. (Cl. 137—630.22)

The invention relates to a gas tap mechanism controlling ignition and main gas valves, in particular for gas water heaters, in which mechanism an axially moving pusher pin successively lifts two coaxially arranged valve bodies from their valve seats between which the ignition gas conduit branches off. Gas tap mechanisms of this type are preferably used for liquid gas, no lubricant being needed in this case—contrary to cock-type gas tap mechanisms—for the valves opening and closing by axial movement. With gas tap mechanisms of this kind the arrangement naturally must be chosen in such a manner that first the ignition valve and then the main gas valve can be opened. Therefore, known gas tap mechanisms of this kind have been provided with gas valves that open in the direction of the gas pressure acting on the valves and are kept in the closed position by a valve spring only. This is not an advantage. In particular, there exists with such valves the danger of the valve being pushed open and thus becoming loose if the valve spring breaks or weakens.

Simple gas valves as such are known which open against the gas pressure. The invention relates on the other hand to a gas tap mechanism with subsequently actuated ignition and main gas valves both of which are opened against the gas pressure, a pusher or traction member taking along the valve body of the main gas valve after having performed the stroke necessary for opening the ignition gas valve.

A particularly simple arrangement of the gas tap mechanism results when a pusher pin is used for the actuation of the ignition valve, the pusher pin sliding with a tight fit in the valve body of the main gas valve and has a catch which carries along the valve body of the main gas valve after the ignition valve has been opened.

The valve body of the ignition gas valve is suitably designed as a cup-shaped body guided by the pusher pin, against which body is supported the valve spring of the main gas valve that is arranged inside the body. This arrangement saves space and permits easy installation and in the non-operation position both valves are closed and are kept closed by the gas pressure as well as by the valve springs. Such an arrangement therefore offers increased safety against leakiness.

Figure 1:
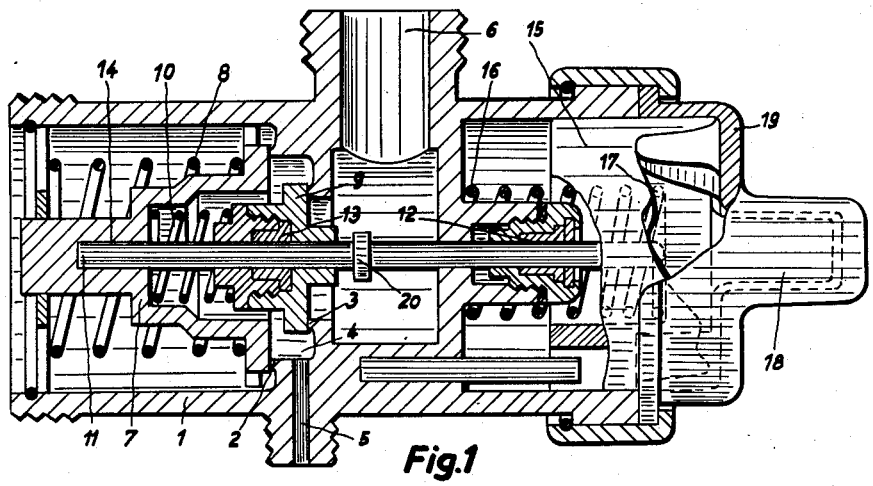
Figure 2:
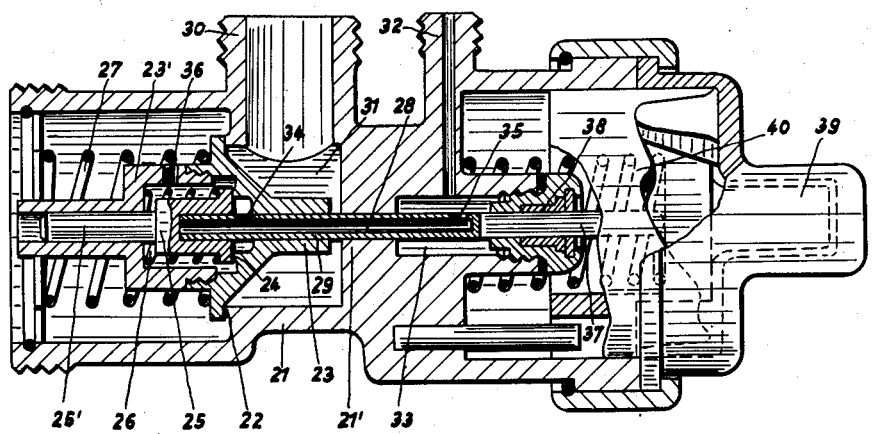

Two embodiments of the invention are represented in Figs. 1 and 2, both of these views being longitudinal, principally in section.

In the gas tap mechanism housing 1 where gas enters at left, two concentric valve seats 2 and 3 are provided. Valve seat 2 has a larger diameter than valve seat 3. An ignition gas channel 5 branches off to the pilot burner, not shown, from an annular space 4 formed between valve seats 2, 3. The main gas channel 6 leading to a burner not shown in the drawings, is arranged behind valve seat 3 when viewed in the direction of flow.

A cup-shaped valve body 7 is supported on valve seat 2, and is kept in the closed position by the gas pressure as well as by the valve spring 8 which presses against the gas tap mechanism housing 1.

Another valve body 9 is arranged concentrically to valve body 7 and is pressed on to valve seat 3, also in the direction of pressure exerted by the gas, by valve spring 10. Valve spring 10 is arranged inside the cup-shaped valve body 7 and presses against this valve body 7.

A pusher pin 11 projecting from the gas-filled space of gas tap mechanism housing 1 through the packing 12, penetrates valve body 9 and packing 13 inserted in the valve body and ends up in a guiding blind-end bore 14 of the cup-shaped valve body 7. The pusher pin 11 rests against a thrust member 15 which is non-pivotably guided in the gas tap mechanism housing 1 and pushed towards the outside by a spring 16. The thrust member 15 is provided with an inwardly projecting cam 17 on which slides a pivotable operating member 19 that is fitted with a rotary grip 18. When turning the operating member 19 the thrust member 15 and at the same time the pusher pin 11 are axially moved. With this initial stage of travel of the pusher pin, valve body 7 is lifted off seat 2 and the gas conduit to the ignition gas conduit 5 accordingly opened. Pusher pin 11 slides in valve body 9 and, during the final stage of travel, valve body 9 is carried along by the collar-type stop 20 on pusher pin 11 and is lifted off its seat 3. This action then opens the main gas channel towards conduit 6.

With the embodiment represented in Fig. 1 the ignition gas valve, which opens first, must have a relatively large diameter, while the diameter of the main gas valve is smaller. This is of some disadvantage when controlling considerable quantities of gas and such disadvantage is avoided with the embodiment represented in Fig. 2.

In the housing 21 of the gas tap mechanism represented in Fig. 2, a valve seat 22 is provided for the main gas valve. The valve body of the main gas valve is comprised of two parts 23, 23' which together form a hollow body. Valve body 23 has a valve seat 24 for ignition gas valve. Valve body 25 of the ignition gas valve carries a guide stud 25' that slides in a lug of valve body part 23'. A closing spring 26 resting on part 23' pushes the valve body 25 against its seat 24. Valve body 23 is acted upon by a closing spring 27 that is securely supported in the housing.

Valve body 25 is fixed to a hollow pusher rod 28 that sides in a lug 29 of the valve body 23 and penetrates a partition wall 21' of the housing 21. A main gas connection branch 30 opens into space 31 of housing 21, while an ignition gas connection branch 32 opens into chamber 33 which is separated from space 31 by the partition wall 21'.

The hollow pusher rod 28 has two lateral openings 34, 35 one of which opening 34 lies inside the valve body 23, 23' behind the valve seat 24, the other opening 35 establishing a communication to chamber 33. Through an opening 36, the inside of the hollow valve body 23, 23' is in open connection with the gas entry side of housing 21.

The extension of the hollow pusher pin 28 is formed by a transmitting pin 37 that projects from chamber 33 through a packing 38. The transmitting pin 37 lies against a thrust member 40 that is actuated from outside by a rotary grip 39 which is axially displaced through an inwardly projecting cam when turning the rotary grip 39.

If the pusher pin 37, 28 is pushed inwardly, valve body 25 is first lifted off its seat 24. The gas entering from the left side can now reach the inside of the hollow thrust pin 28 through openings 36, 34 and pass through the opening 35 and the chamber 33 to the ignition gas connection branch 32. When the ignition gas valve 24, 25 is fully opened, valve body 25 approached main gas valve 23'. If now the pusher pin 37, 28 is pushed further inwardly, valve body 23, 23' of the main gas valve is carried along and lifted off its seat 22 so that the gas can reach the main gas connection branch 30 through the space 31. During this action the ignition gas conduit as described above remains open without any change.

I claim:

1. A sequentially opening double gas valve for fully manual control of separate ignition and main flows including a housing having a gas inlet, a main gas outlet and a smaller diameter ignition gas outlet all adapted for connection to rigid gas conduits coaxially arranged valve seats within the housing, with the outlets communicating with the inlet through separate valve seats and separate passages from each valve to one outlet, said valve also including ignition and main valve members spring-biased toward closed positions and arranged to close on the inlet sides of the valve seats to close even in the event of spring failure, the ignition valve member controlling flow to the ignition outlet and being subject to inlet pressure at all times, and the main valve member controlling flow to the main outlet and being subject to inlet pressure at least when the ignition valve is open, an axially shiftable push pin extending through both valve seats and connected to the two valve members to lift the ignition valve member first and after it reaches its open position lift the main valve member, a handle movably carried by the housing, and cam means operated at will by the handle for shifting the push pin, and shaped to be shelf-holding at least at the position holding only the ignition valve member lifted and the position holding both valve members lifted.

2. A sequentially opening double gas valve according to claim 1 in which the seat for the ignition valve member is formed in the main valve member and the push pin has a tubular portion forming part of the communication between the inlet and the ignition outlet.

References Cited in the file of this patent

UNITED STATES PATENTS

| 254,615 | Colvin | Mar. 7, 1882 |
| 885,347 | Kenly | Apr. 21, 1908 |
| 2,074,240 | Saunders | Mar. 16, 1937 |
| 2,288,417 | Paille | June 30, 1942 |
| 2,508,064 | Hazard | May 16, 1950 |
| 2,687,169 | Maurice | Aug. 24, 1954 |
| 2,687,742 | Crookston | Aug. 31, 1954 |
| 2,702,052 | Grayson | Feb. 15, 1955 |

FOREIGN PATENTS

| 488,480 | Canada | of 1952 |